March 5, 1935.  O. U. ZERK  1,992,981
HANGER MECHANISM
Filed Aug. 2, 1932
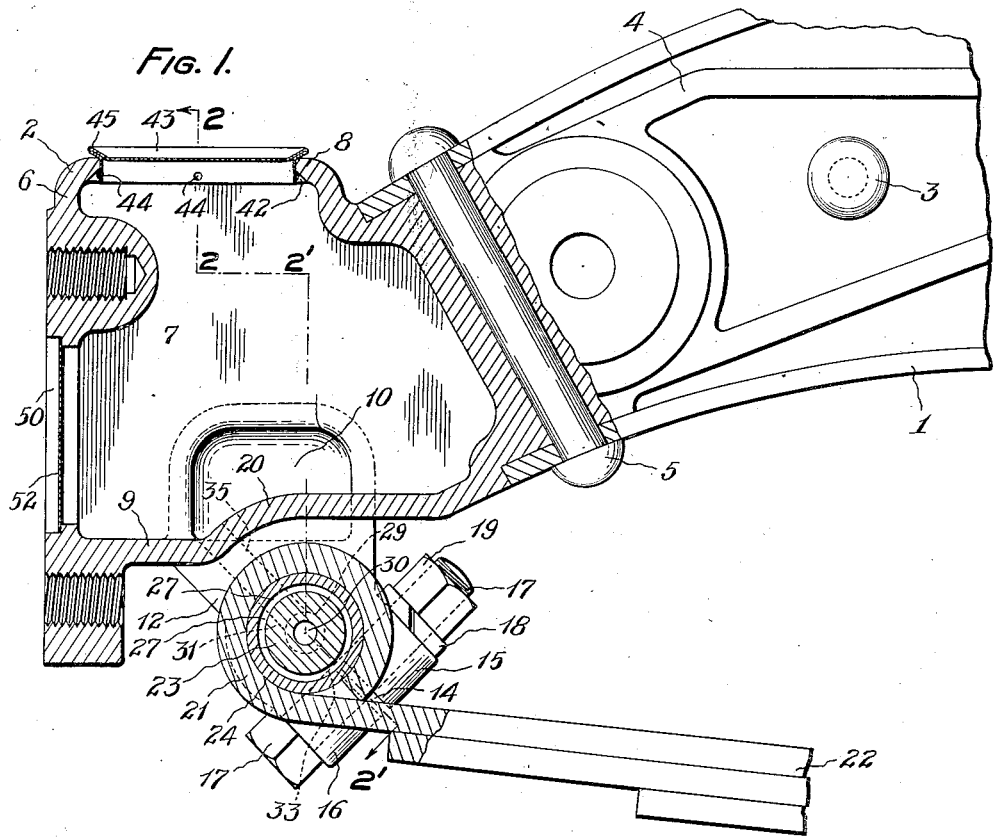
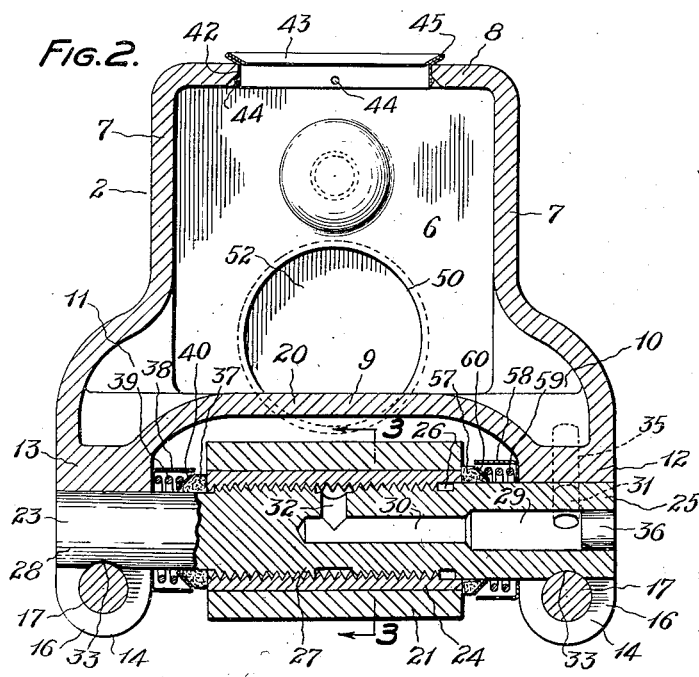
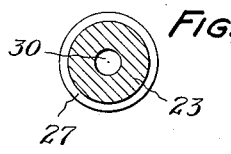
Fig. 3.
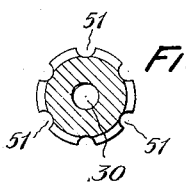
Fig. 4.
INVENTOR.
Oscar U. Zerk
By Slough & Canfield
ATTORNEYS Patented Mar. 5, 1935

1,992,981

UNITED STATES PATENT OFFICE 1,992,981

HANGER MECHANISM

Oscar U. Zerk, Chicago, Ill.

Application August 2, 1932, Serial No. 627,265

15 Claims. (Cl. 267—54)

This invention relates to an improved shackle hanger mechanism for connecting the frame of a vehicle body to the spring suspension therefor.

Heretofore shackle hanger mechanisms have been provided with various types of lubricating means, the lubricating means being periodically resupplied with lubricant after each operation of the vehicle for predetermined mileage such as 500 or 1000 miles. This was necessary inasmuch as the lubricant would continuously seep from the shackle hanger mechanism during operation of the vehicle. Such periodic rechargings of the lubricant entailed inconvenience and relatively great expense.

It is an object of my invention to provide an improved shackle hanger bearing mechanism for vehicles or the like.

It is another object of my invention to provide a shackle hanger bearing mechanism for vehicles and the like, having improved means for effectively sealing the bearing portion thereof against the ingress of foreign abrasive substances thereto.

Another object is to provide a shackle hanger mechanism for vehicles and the like having improved means to retain in the bearing portion thereof an initial supply of bearing lubricant.

Another object is to provide a shackle hanger bearing mechanism having means for retaining initially applied lubricant in the bearing portion of the mechanism throughout the life of the mechanism or of the vehicle upon which it is employed.

Another object is to provide an improved shackle hanger mechanism for vehicles and the like which is susceptible of manufacture by relatively inexpensive screw-machine and stamping operations.

Another object is to provide an improved shackle hanger mechanism for vehicles and the like which may be easily and efficiently assembled.

Another object is to provide a shackle hanger mechanism for vehicles and the like wherein lateral movement due to side sway or the like of the vehicle is relatively restrained in an improved manner.

These and other objects of my invention will become increasingly apparent from a consideration of the accompanying description and drawing wherein like parts refer to like reference characters, wherein:

Fig. 1 is a view partially in vertical medial section and partly in elevation of a preferred embodiment of my invention;

Fig. 2 is a section taken along the lines 2—2—2'—2' of Fig. 1;

Fig. 3 is a section taken along the lines 3—3 of Fig. 2;

Fig. 4 is a transverse sectional view showing a modified form of shackle bolt which I may employ in connection with my invention.

Referring to the accompanying drawing which illustrates a preferred form of my invention, I have shown a spring end connection for vehicles wherein 1 indicates the longitudinal sill or frame member of a vehicle chassis having rigidly secured thereto a hanger generally indicated at 2. The vehicle frame member 1 which is of conventional construction is preferably of channel shape and the hanger 2 is secured thereto in any suitable manner such as a rivet 3 which extends transversely through an arm 4 of the hanger and a channel web, and a rivet 5 which extends through the upper and lower flanges of the channel and an intermediately disposed relatively enlarged portion of the hanger arm 4. This is a conventional construction and constitutes no essential part of my invention.

The arm 4 has integral therewith a preferably cast metal casing the contour of which is clearly illustrated from the sections indicated in Figs. 1 and 2 and comprises a generally vertical end wall 6, side walls 7—7, top wall 8 and base 9. The side walls 7—7 together with the base 9 are flared outwardly to form laterally disposed pockets 10 and 11. Directly beneath the pockets 10 and 11 and integral with the base 9 are clamping jaws 12 and 13 comprising downwardly extending lugs provided with a centrally bored portion having a slot leading therefrom as indicated at 14 to form jaws as indicated at 15 and 16 provided with aligned apertures adapted to receive a bolt 17 secured by a lock washer 18 and a nut 19, whereby the bored portion may constrictingly engage a bolt or the like disposed therein.

The casing base 9 is relatively raised as indicated at 20 intermediate the pockets 10 and 11 so that ample clearance may be provided for a spring eye or the like disposed between the clamping lugs 12 and 13. A generally tubular spring eye 21 adapted to support one end of a spring 22 is disposed intermediate the clamping lugs 12 and 13 and is supported by a shackle bolt 23, the ends of which are constrictingly engaged by the bored portions of the clamping jaws.

An internally threaded tubular bushing 24 is preferably secured within the spring eye 21 in any suitable manner such as press-fitting, one end of the bushing being bored to a diameter substantially equal to the root diameter of the threaded portion.

The shackle bolt 23 comprises a cylindrical rod having an enlarged end portion 25, a relatively narrow slightly recessed portion as indicated at 26, a generally centrally threaded portion 27, and a relatively reduced cylindrical end 28. The shackle bolt 23 has a coaxial bore extending from the base of end 25 as indicated at 29 terminating in a relatively reduced coaxial bore 30 which extends preferably beyond the central portion of the bolt. Radially disposed ducts 31 and 32 extend respectively from the longitudinal bores 29 and 30 to the surface of the shackle bolt.

The shackle bolt 23 is further provided with transverse grooves as indicated at 33—33 whereby upon insertion of the clamping bolt 17, the shackle bolt will be prevented from lateral or rotational movement relative to clamping lugs 12 and 13.

Pocket 10 is provided with a duct 35 adapted to align with duct 31 of the shackle bolt thereby forming a continuous line of communication from the casing to substantially the central external threaded surface of the shackle bolt. A plug 36 or any suitable means may be employed to seal the ends of duct 29 after the drilling and machining operations are completed.

Preferably frusto-conical shaped sealing rings of any suitable material encircle the shaft and about each end of the bushing 24 as indicated at 37 and 57, the sealing rings being held in fluid-tight relation with their engaging surfaces by means of normally compressed springs 39 and 59 which engage the rings 37 and 57 respectively. Preferably sheet metal caps 38 and 58 which encircle the bolt ends and substantially enclose the aforesaid springs are provided to prevent excess foreign substances from interfering with the spring action and as a guard to protect the springs from shocks and the like. Preferably sheet metal frusto-conical shaped rings are provided intermediate the springs and the sealing washers whereby the springs may seat upon the caps as indicated at 40 and 60 and thus evenly distribute the spring pressure to the sealing rings. Thus, if the sealing rings 37 and 57 are always maintained in spring-pressed relation with both the bushing ends and the bolt surfaces, any lubricant intermediate the sealing rings will be effectively retained and a negligible amount of seepage will result even over relatively long periods, such as the life of the end connector or the vehicle upon which employed.

The casing top wall 8 is substantially centrally apertured as indicated at 42 to provide a seat for a sheet metal cap 43, the cap having a relatively resilient band provided with spaced projections 44 whereby the cap will be maintained in position through engagement of the projections 44 with the preferably beveled under side of top wall 8 of the casing.

Lubricant may be supplied to the casing by removing the cap 43, the cap preferably being provided with an outwardly flaring flange 45 to permit of easy removal of the cap. The cap 43 is preferably vented to ensure that no air will be trapped in the casing while being filled with lubricant.

The casing may be initially filled with lubricant which will be communicated to the relatively movable parts, namely the shackle bolt 23 and the bushing 24 by means of the duct 35, aligned duct 31, duct 29, duct 30 and radially extending duct 32 leading to the surface of the shackle bolt. As the spring and spring eye move vertically due to road impacts and the like, there will be a relatively slight lateral movement due to the threaded relation between the shackle bolt and the bushing, thus effectively lubricating the inter-engaged, relatively movable surfaces. The threaded relation between the shackle bolt rigidly affixed to the hanger and the spring eye restrains lateral movement other than the aforementioned slight lateral movement due to the pitch of the thread as the spring eye and the shackle bolts are relatively moved.

The shackle bolt which I preferably employ and illustrated in cross section in Fig. 3, due to its relatively large engaging surface with the bushing, minimizes the tendency for a high viscosity oil which might be employed to escape.

I have illustrated in Fig. 4 a modified type of shackle bolt which I may employ which is generally similar to that illustrated in Fig. 3 but wherein longitudinally extending grooves 51 are provided whereby the lubricant may be more effectively carried to the relatively movable surfaces of the shackle bolts and the enclosing bushing. These grooves are preferably slightly deeper than the root of the threads but preferably do not extend below the diameter of the cylindrical portions surrounded by the packing rings nor extend longitudinally into these cylindrical portions.

The grooves also function as settling or collecting chambers to collect particles of abrasive material which may wear off of the threads or foreign materials which may in any manner find ingress thereto.

In casting the casing 2, the core may be supported from the opening 42 provided in the top wall 8; or, if desired, an additional core support may be provided laterally by means of an aperture 50 which may be sealingly closed by a Welsh plug 52 which may be expanded to tightly engage the walls of the aperture 50 in a manner well understood in the art.

The end connector as described, due to its hollow construction, has relatively great strength per unit of weight, is relatively inexpensive to manufacture and assemble, and is adapted to maintain the spring connection efficiently lubricated throughout the entire life of the end connector or the vehicle upon which employed with an initial supply of lubricant.

Although I have shown and described a preferred embodiment of my invention, it is understood that numerous and extensive departures may be made therefrom without departing from the spirit of my invention and the scope of the appended claims.

Having thus described my invention, what I claim is:

1. A hanger mechanism for securing a spring to a vehicle body comprising a shackle bolt threadedly engaging the spring eye, a member rigidly secured to the vehicle body and rigidly supporting the shackle bolt at each end, the spring being movable rotatively and longitudinally of the bolt and means intermediate the spring eye and member for sealing the shackle bolt relative to the spring eye.

2. A hanger mechanism for securing a spring to a vehicle frame comprising a shackle bolt threadedly engaging the spring eye having end portions extending outwardly therefrom, a casing rigidly secured to the vehicle frame and having integral downwardly projecting portions supporting said bolt at the outer portions, and a communicating duct from said casing to the external threaded portion of said bolt, whereby the lubricant from the casing may be fed by gravity to said bolt.

3. A hanger mechanism for securing a spring to a vehicle frame comprising a shackle bolt threadedly engaging the spring eye and having non-threaded outwardly projecting ends, a casing rigidly secured to the vehicle frame and having spaced downwardly extending portions relatively non-rotatably supporting the shackle bolt at the end portions, sealing rings encircling the non-threaded portion of the bolt and abutting each end of the spring eye, and means for maintaining the sealing rings in pressure relation with the said surfaces.

4. A hanger mechanism for securing a spring to a vehicle frame comprising an internally threaded bushing rigidly secured within a spring eye, a shackle bolt having a centrally threaded portion and cylindrical non-threaded end portions engaging the bushing, a supporting casing rigidly secured to the vehicle frame and having integral and downwardly extending portions adapted to constrictingly engage the bolt end portions at points spaced outwardly from the bushing, communicating means from the casing to the threaded surface of the bolt whereby lubricant contained in the casing may be fed thereto, and means for relatively sealing the ends of the bushing and the adjacent bolt surface.

5. A hanger mechanism for securing a spring to a vehicle frame, substantially as described in claim 4, characterized by a removable cap in said casing whereby it may be filled with lubricant or the like.

6. A hanger mechanism for securing a spring to a vehicle frame comprising a relatively large generally box-shaped casing rigidly secured to the vehicle frame by an integral laterally extending arm, downwardly extending jaws having aligned transversely extending bores and slotted whereby the jaws may be constrictingly drawn together, a shackle bolt having cylindrical end portions and a threaded central portion relatively non-rotatably supported by the jaws, a spring eye encircling and threadedly engaging the central portion of the bolt, the portions of the bolt at the thread terminations being of relatively reduced diameter whereby the spring eye may move laterally as it is rotated relative to the bolt, and spring-pressed sealing means sealing the spring eye and the adjacent bolt surfaces.

7. A hanger mechanism for securing a spring to a vehicle frame comprising a supporting casing rigidly secured to the vehicle frame having laterally and downwardly extending pockets in the base thereof, supporting jaws integrally secured to the base and provided with aligned transverse bores, a shackle bolt supported at the end portions by the said jaws and having a centrally threaded portion, a spring eye encircling and threadedly engaging the bolt central portion, a frusto-conical shaped sealing washer encircling the bolt and abutting the end of the spring eye, a sheet metal cap encircling the bolt and abutting the inner face of the jaws, a normally compressed spring disposed within the cap and bearing upon the cap and the sealing ring, the casing being provided with a duct in one of said pockets adapted to communicate with an angularly disposed duct provided in the shackle bolt whereby lubricant from the casing may be fed to the threaded portion of the shackle bolt.

8. A hanger mechanism for securing a spring to a vehicle frame substantially as described in claim 7, characterized by a plurality of longitudinally extending grooves in the threaded portion of the bolt to provide settling pockets for foreign abrasive substances.

9. In a hanger connection between a vehicle body and a spring eye, a bolt element having an intermediate portion rotatably screw-threadedly connected to the spring eye, a pair of lug elements on the body rigidly connected to corresponding ends respectively of the bolt element, a lubricant chamber on the body and a duct therefrom communicating with the intermediate threaded portion of the bolt element, said bolt element having longitudinal grooves in the threads thereof.

10. In a hanger connection between a vehicle body and a spring eye, a bolt element having an intermediate portion rotatably screw-threadedly connected to the spring eye, a pair of lug elements on the body rigidly connected to corresponding ends respectively of the bolt element, a lubricant chamber on the body and a duct therefrom communicating with the intermediate threaded portion of the bolt element, said bolt element being threaded into a bushing pressed into the eye and having cylindrical end portions projecting from the bushing, and annular sealing elements sealing the cylindrical portions and the bushing ends.

11. In a connection between a vehicle frame and a spring eye, a bolt element having an intermediate portion screw threadedly connected to the spring eye, said bolt having a cylindrical end portion projecting from said eye, an annular sealing element sealing the spring eye and the cylindrical bolt portion, and means for maintaining said sealing element in pressure relation with said surfaces.

12. In a spring hanger connection, a member rigidly secured to the vehicle frame, said member having a lubricant chamber associated therewith, a bolt element rigidly supported by said member and having an intermediate portion rotatively screw threadedly connected to a spring eye, a duct leading from the lubricating chamber and communicating with the intermediate threaded portion of the bolt element, the lubricant in said chamber being pumped therefrom by rotation of the spring eye relative to the bolt.

13. In a spring hanger connection, a member rigidly secured to the vehicle frame, said member having a lubricant chamber associated therewith, a bolt element rigidly supported by said member and having an intermediate portion rotatively screw threadedly connected to a spring eye, a duct leading from the lubricating chamber and communicating with the intermediate threaded portion of the bolt element, the lubricant in said chamber being pumped therefrom by rotation of the spring eye relative to the bolt, and sealing rings encircling the bolt and abutting each end of the spring eye, and means for maintaining said sealing rings in pressure relation with the said surfaces.

14. In a connection between a vehicle frame and a spring eye, a casing rigidly secured to the frame, said casing having a lubricant chamber associated therewith, a bolt element rigidly supported by said casing, said bolt element having an intermediate portion screw threadedly connected to the spring eye, said bolt having cylindrical end portions projecting from said eye, annular sealing elements sealing the spring eye end and the cylindrical bolt portion, and a communicating duct from said lubricating chamber to the threaded portion of said bolt.

15. In a connection between a vehicle frame and a spring eye, a casing rigidly secured to the frame, said casing having a lubricant chamber associated therewith, a bolt element rigidly supported by said casing, said bolt element having an intermediate portion screw threadedly connected to the spring eye, said bolt having cylindrical end portions projecting from said eye, annular sealing elements sealing the spring eye end and the cylindrical bolt portion, a communicating duct from said lubricating chamber to the threaded portion of said bolt, and means to maintain said sealing elements in pressure relation with said surfaces.

OSCAR U. ZERK.